(12) United States Patent
Naito

(10) Patent No.: US 6,276,802 B1
(45) Date of Patent: Aug. 21, 2001

(54) REAR PROJECTION DISPLAY

(75) Inventor: Keijiro Naito, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/288,222

(22) Filed: Apr. 8, 1999

(30) Foreign Application Priority Data

Apr. 17, 1998 (JP) .................................................. 10-124187

(51) Int. Cl.$^7$ .................................................. G03B 21/22
(52) U.S. Cl. .............................................. 353/74; 348/781
(58) Field of Search .................................... 359/449, 456, 359/453, 443, 460; 348/766, 781, 782, 784, 786, 788; 353/30, 31, 37, 71, 74, 77, 119

(56) References Cited

U.S. PATENT DOCUMENTS 5,557,343 * 9/1996 Yamagishi ............................ 348/781
5,611,611 * 3/1997 Ogino et al. ............................ 353/77

FOREIGN PATENT DOCUMENTS

WO98/19213    5/1998  (JP) .

* cited by examiner

*Primary Examiner*—Safet Metjahic
*Assistant Examiner*—E. P LeRoux
(74) *Attorney, Agent, or Firm*—Oliff & Berridge, PLC (57) ABSTRACT

Methods and apparatus for using more effectively the front side area of a rear projection display as a screen positioning area disclosed. Almost all of the p-polarized light beams emitted from an image projector are reflected by a polarizing selection element, and almost all of the reflected light beams are converted into s-polarized light beams by a polarizing conversion mirror as the light beams are reflected towards a screen. Of the s-polarized light beams produced as the light beams are reflected by the polarizing conversion mirror, those that are not incident upon the polarizing selection element strike the screen in order to form an image. On the other hand, those that are incident upon the polarizing selection element pass through the polarizing selection element and strike the screen in order to form an image thereon.

8 Claims, 6 Drawing Sheets

REAR PROJECTION DISPLAY

BACKGROUND OF THE INVENTION

1. Field of Invention

The present invention relates to a rear projection display for displaying an image thereon by projecting the image from the rear side of a screen.

2. Description of Related Art

Figure 6:
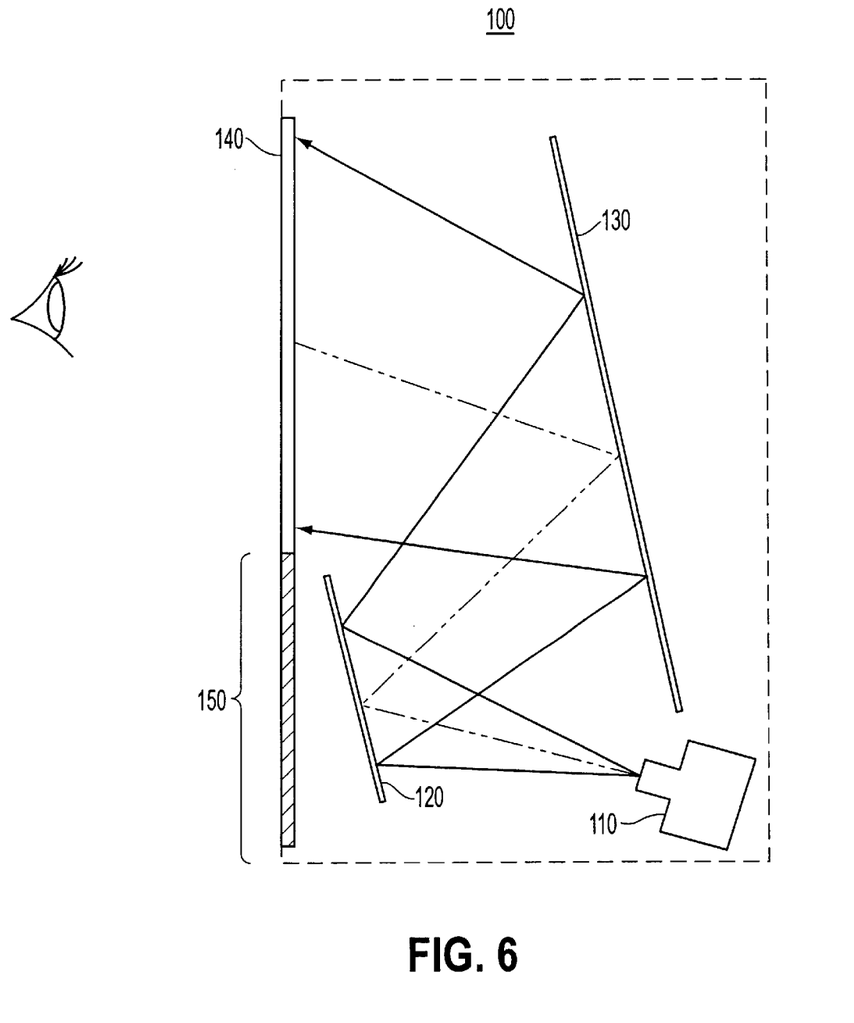
FIG. 6 is a schematic view of the structure of a rear projection display, as seen from a side thereof.

Projection displays, for projecting and displaying an image in enlarged form on a screen, are known as displays with large screens. One type of such projection displays is the rear projection display. FIG. 6 is a schematic view of the structure of a rear projection display as seen from a side thereof. The rear projection display 100 consists of, in general, an image projector 110, two reflecting mirrors 120 and 130, and a screen 140. Light from the image projector 110 is reflected by the two reflecting mirrors 120 and 130, and then projected onto the rear (back) side of the screen 140. This causes an image to be formed at the back surface of the screen, the image being viewable from the front side of the screen.

At the front side of the rear projection display 100, a space 150 for positioning the reflecting mirror 120 must be provided below the screen 140. Therefore, only the upper area of the front side of the rear projection display 100, that is, the area of the front side of the rear projection display 100 excluding the space 150, can be used as screen 140 positioning area This does not allow effective use of the front side area of the rear projection display 100 as the screen 140 positioning area.

SUMMARY OF THE INVENTION

It is an object of the present invention to provide a technique which overcomes the above-described problem present in conventional rear projection displays in order to allow more effective use of the front side area of the rear projection display as a screen positioning area.

In order to at least partly overcome the above-described problem, according to the present invention, there is provided a rear projection display consisting of:

a screen having a front side and a back side, the screen displaying the image on the front side by light projected onto the back side;

an image projector consisting of a light source and a modulating element that modulates light emitted from the light source in accordance with image information, in which first linearly polarized light beams of the light beams modulated by the modulating element are directed towards a predetermined location on the screen;

a polarizing selection element positioned at least on an optical path extending from the image projector to a back surface on the back side of the screen, the polarizing selection element reflecting the first linearly polarized light beams emitted from the projector, and letting pass therethrough linearly polarized light beams with a polarization direction perpendicular to that of the first linearly polarized light beams; and a polarizing conversion reflection element positioned on an optical path of the light reflected by the polarizing selection element, the polarizing conversion reflection element converting the first linearly polarized light beams, reflected by the polarizing selection element, into second linearly polarized light beams with a polarization direction substantially perpendicular to that of the linearly polarized light beams reflected by the polarizing selection element for reflection towards the screen, at least some of the second linearly polarized light beams emitted from the polarizing conversion reflection element passing through the polarizing selection element and striking the back side of the screen.

According to the above-described construction, almost all of the first linearly polarized light beams projected from the image projector are reflected by the polarizing selection element and strike the polarizing conversion reflection element. The polarization direction of the first polarized light beams, incident upon the polarizing conversion reflection element, is changed by approximately 90 degrees in order to convert them into second polarized light beams with a polarization direction substantially perpendicular to that of the first linearly polarized light beams for reflection towards the screen. Here, the polarization direction of the second linearly polarized light beams is substantially the same as that of the linearly polarized light beams which pass through the polarizing selection element. Therefore, of the second polarized light beams which have left the polarizing conversion reflection element, those incident upon the polarizing selection element pass therethrough and strike the back side of the screen. This causes an image to be projected onto the portion of the screen located at the light-outgoing surface side of the polarizing selection element, at the front side area of the rear projection display. Therefore, the front side area of the rear projection display can be effectively used as a screen positioning area.

The polarizing selection element may be positioned on the back surface of the screen.

Here, it is preferable that the polarizing conversion reflection element consist of a reflecting mirror and a λ/4 phase element positioned on an optical path of light incident upon and reflected by the reflecting mirror.

According to the above-described structure, the first linearly polarized light beams, incident upon the λ/4 phase element, pass through the λ/4 phase element and are then reflected by the reflecting mirror, after which the reflected light beams pass once again through the λ/4 phase element in order to be converted into second linearly polarized light beams. Accordingly, the first linearly polarized light beams, incident upon the polarizing conversion reflection element, are converted into second linearly polarized light beams for reflection.

The polarizing selection element may be divided into a plurality of sections, the polarization separating characteristics of each section being adjusted in accordance with an angle of incidence of light with respect to each section.

Usually, the polarization separating characteristics of the polarizing selection element vary depending on the angle of incidence of light. According to the above-described structure, the polarizing separating characteristics of each section is adjusted in accordance with the angle of incidence of light with respect to each section, making variations in the intensity of light passing through the polarizing selection element less dependent upon the location through which the light passes, so that variations in brightness and color of the image projected onto the screen can be reduced.

DETAILED DESCRIPTION OF PREFERRED EMBODIMENTS

Figure 1:
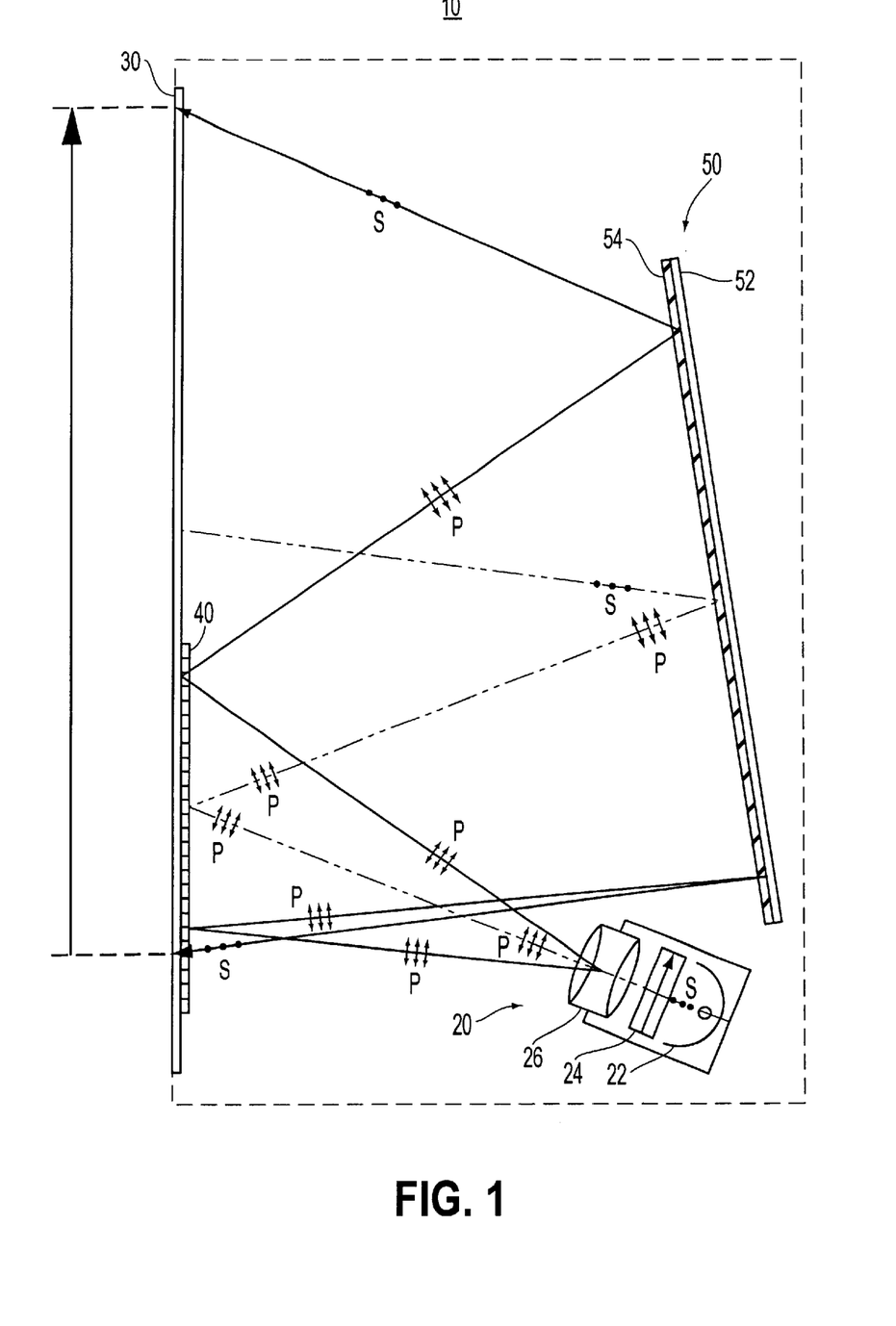
FIG. 1 is a schematic view of the structure of a rear projection display of a first embodiment of the present invention, as seen from a side thereof.

A description will now be given of an embodiment of the present invention. FIG. 1 is a schematic view of the structure of a rear projection display of a first embodiment of the present invention, as viewed from a side thereof. The rear projection display 10 consists of an image projector 20, a screen 30, a polarizing selection element 40, and a polarizing conversion mirror 50.

The screen 30 is provided so as to extend along almost the entire front side of the rear projection display 10. It is a rear screen in that light is projected from the back side of the screen where an image is formed, with the image being viewable from the front side of the screen.

The image projector 20 consists of a light source 22, a light valve 24, and a projecting lens 26. Of the light beams from the light source 22, the light valve 24 modulates predetermined linearly polarized light beams by a modulating element based on given image information in order to cause predetermined linearly polarized light beams of the modulated light beams to emit therefrom. A type of light valve which may be used as light valve 24 is the transmission type liquid crystal light valve which consists of a polarizing element for selectively letting pass therethrough, for example, the s-polarized light beams of the light beams emitted from the light source 22; a liquid crystal panel for modulating the s-polarized light beams incident thereupon; and a polarizing element for selecting the p-polarized light beams of the modulated light beams and causing them to emit therefrom. The projecting lens 26 projects the modulated light beams emitted from the light valve 24 onto the back side of the screen 30 where an image is formed. This means that the image projector 20 projects an image to be displayed on the screen 30 in enlarged form. The image projector 20 is positioned at the back side of the rear projection display 10 so that light is projected towards the screen 30.

The polarizing selection element 40 is formed on the screen 30 so as to be located within an area where light projected by the image projector 20 first reaches the screen 30. The polarizing selection element 40 is a polarization separating film which virtually reflects only p-polarized light beams and which virtually transmits therethrough only s-polarized light beams. The polarization separating film can be realized by using, for example, a dielectric multilayer film. Since the light beams projected by the image projector 20 are p-polarized light beams, they are reflected by the polarizing selection element 40 towards the polarizing conversion mirror 50. Therefore, almost all of the light beams directly projected by the image projector 20 are reflected by the polarizing selection element 40 and, therefore, do not reach the screen 30.

The polarizing conversion mirror 50 consists of a reflecting mirror 52, and a λ/4 phase element 54 provided on the reflecting surface of the reflecting mirror 52. The λ/4 phase element 54 is formed by a λ/4 phase film. Although the λ/4 phase element 54 of FIG. 1 is formed on the reflecting mirror 52, it may be separated a short distance from the reflecting mirror 52. Light reflected by the polarizing selection element 40 is converted into circularly polarized light as they pass through the λ/4 phase element 54, and then the converted light beams are reflected by the reflecting mirror 52 and pass once again through the λ/4 phase element 54. The circularly polarized light beams reflected by the reflecting mirror 52 are converted into s-polarized light beams. In other words, the p-polarized light beams that have struck the polarizing conversion mirror 50 are converted into s-polarized light beams, which emit from the polarizing conversion mirror 50 and travel towards the screen 30.

The s-polarized light beams emitted from the polarizing conversion mirror 50 are projected onto the back side of the screen 30. As mentioned above, since the polarized selection element 40 allows s-polarized light beams to pass therethrough, almost all of the s-polarized light beams, after reflection of the light beams by the polarizing conversion mirror 50, pass through the polarizing selection element 40 and are projected onto the back side of the screen 30. Focusing the image projector 20 such that the s-polarized light beams meet at the back surface side of the screen 30 causes an image to be displayed on the screen 30.

Accordingly, in the rear projection display 10 of the first embodiment, the portion of the front side area of the display 10 where the polarizing selection element 40 is positioned can also be used when positioning the screen 30. Therefore, it is possible to eliminate almost all of the dead space which had to be provided for positioning a reflecting mirror in conventional projection displays, so that almost all of the front side area of the display 10 can be effectively used as a screen positioning area. Consequently, a screen used in the rear projection display of the present invention can be made larger than a screen used in a conventional rear projection display of equal size. In addition, when screens of identical sizes are used, the overall size of the rear projection display can be made smaller than that of conventional projection displays.

Although in the embodiment the light beams emitting from the image projector 20 are p-polarized light beams, these light beams may be s-polarized light beams. In this case, the polarizing selection element 40 is formed so as to reflect s-polarized light beams and to let p-polarized light beams pass therethrough. In addition, the light beams emitting from the light source 22 may be p-polarized light beams, and the light beams emitting from the light valve 24 may be s-polarized light beams.

Figure 2:
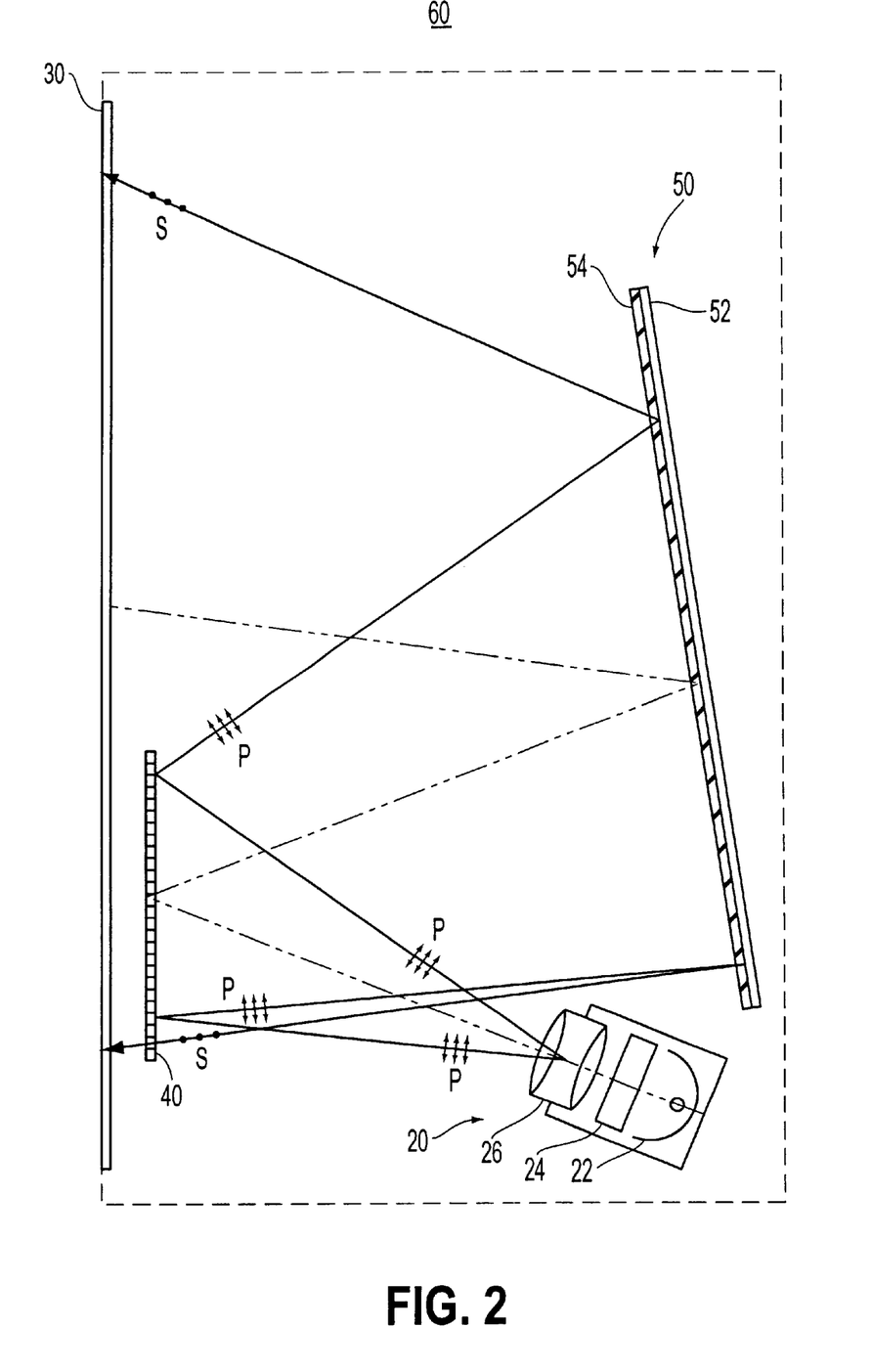
FIG. 2 is a schematic view of the structure of a rear projection display of a second embodiment of the present invention, as seen from a side thereof.

FIG. 2 is a schematic view of the structure of a rear projection display of a second embodiment of the present invention, as seen from a side thereof. The structure of the rear projection display 60 is the same as that of the rear projection display 10 of the first embodiment, except that the polarizing selection element 40 is positioned a short distance away from the screen 30. The component parts used in the second embodiment and corresponding component parts used in the first embodiment have similar functions, so that they will not be described below.

As with the rear projection display 10 of the first embodiment, the rear projection display 60 makes it possible to eliminate almost all of the dead space provided for positioning an image projector and a reflecting mirror in conventional rear projection displays. Accordingly, it allows almost all of the front side area of the rear projection display 60 to be used as screen positioning area In addition, the polarizing selection element 40 of the rear projection display 60 is positioned closer to the image projector 20 than the polarizing selection element 40 of the rear projection display 10, so that the polarizing selection element 40 used in the second embodiment can be made smaller.

Figure 3:
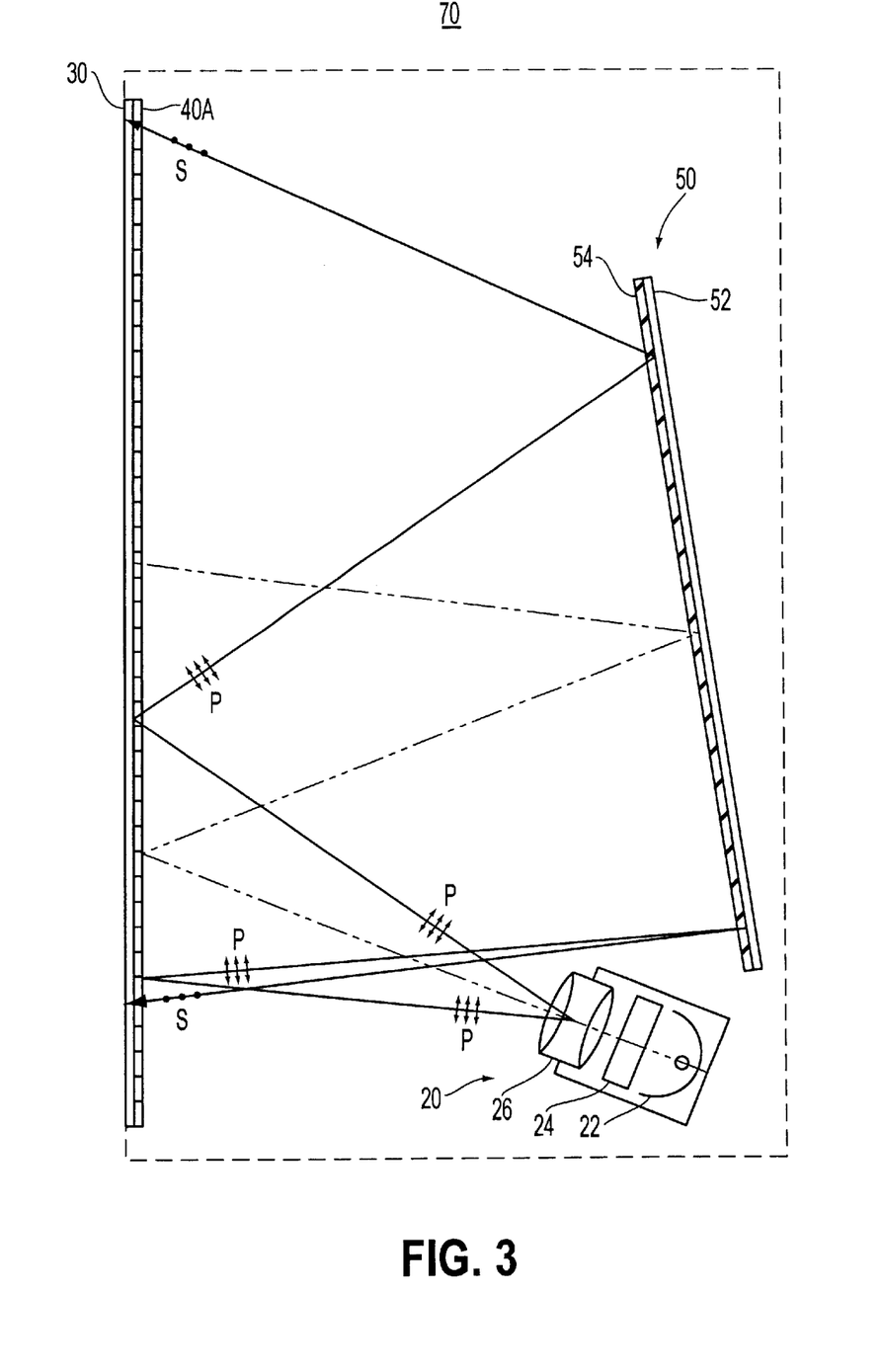
FIG. 3 is a schematic view of the structure of a rear projection display of a third embodiment of the present invention, as seen from a side thereof.

FIG. 3 is a schematic view of the structure of a rear projection display of a third embodiment of the present invention, as seen from a side thereof. The structure of the rear projection display 70 is the same as that of the rear projection display 10 of the first embodiment, except that the polarizing selection element 40A is provided so as to be formed along the entire back surface of the screen 30. The component parts used in the third embodiment and corresponding parts used in the first embodiment have similar functions so that they will not be described below.

As with the rear projection display 10 of the first embodiment, the rear projection display 70 makes it possible to eliminate almost all of the dead space provided for positioning an image projector and a reflecting mirror in conventional rear projection displays. Accordingly, it allows almost all of the front side area of the rear projection display 70 to be used as screen positioning area In the first and second embodiments, the back surface of the screen is divided into an upper area not covered by the polarizing selection element 40 and a lower area covered by the polarizing selection element 40. This may cause the image brightness at the upper and lower areas of the screen 30 to differ. In contrast, in the rear projection display 70 of the third embodiment shown in FIG. 3, the polarizing selection element 40A is formed along the entire back surface of the screen 30, so that the image brightness at the upper and lower areas of the screen 30 differ only slightly. It is to be noted that the polarizing selection elements 40 used in the first and second embodiments can be made smaller than the polarizing selection element 40A used in the third embodiment.

Figure 4:
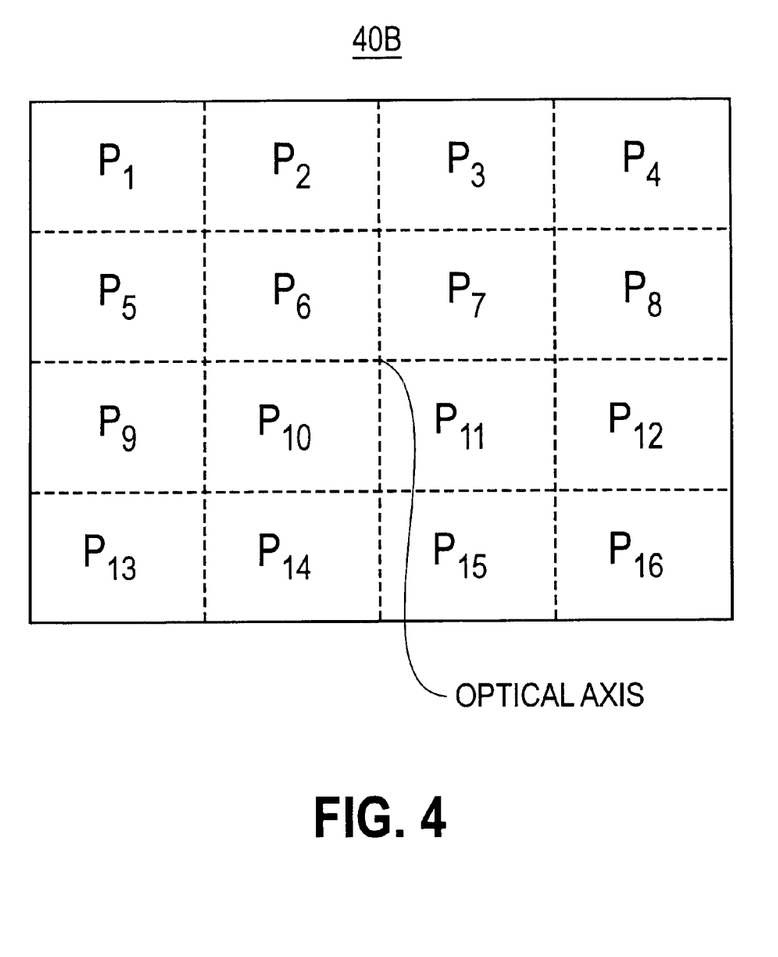
FIG. 4 illustrates a modification of the polarizing selection element, as viewed from the front.

FIG. 4 illustrates a modification of the polarizing selection element 40A, as viewed from the front. The polarizing selection element 40B is divided into a plurality of areas $P_1$ to $P_{16}$. The areas $P_1$ to $P_{16}$ are formed such that the polarization separating characteristics have values which are approximately equal with respect to typical (for example, average) values of angle of incidence of light incident upon the areas $P_1$ to $P_{16}$. As mentioned above, the polarizing selection element is generally formed using a dielectric multilayer film. The polarization separating characteristics of the dielectric multilayer film may vary depending on the angle of incidence of light, which varies considerably depending on the location of the screen when it is large. In this case, if the polarization separating characteristics of the polarizing selection element are uniform, the portions of the image, projected onto the screen, differ in brightness or color depending on where they are projected on the screen. To overcome this problem, the polarizing selection element 40B is divided into a plurality of sections, as shown in FIG. 4. When the polarization separating characteristics are adjusted according to the angle of incidence of light with respect to each of the areas, it is possible to prevent the brightness or color of the portions of the image from being different depending on where the portions of the image are on the screen 30.

Although in the embodiment the polarizing selection element 40B is divided horizontally and vertically into 16 parts in a matrix arrangement, the number of divisions is not limited thereto. It may also be divided so that there are more divisions away from the center, that is, towards the periphery thereof. Instead of dividing the polarizing selection element 40B into a plurality of sections, it may be formed such that its polarization separating characteristics vary continuously depending on the angle of incidence of light.

Figure 5:
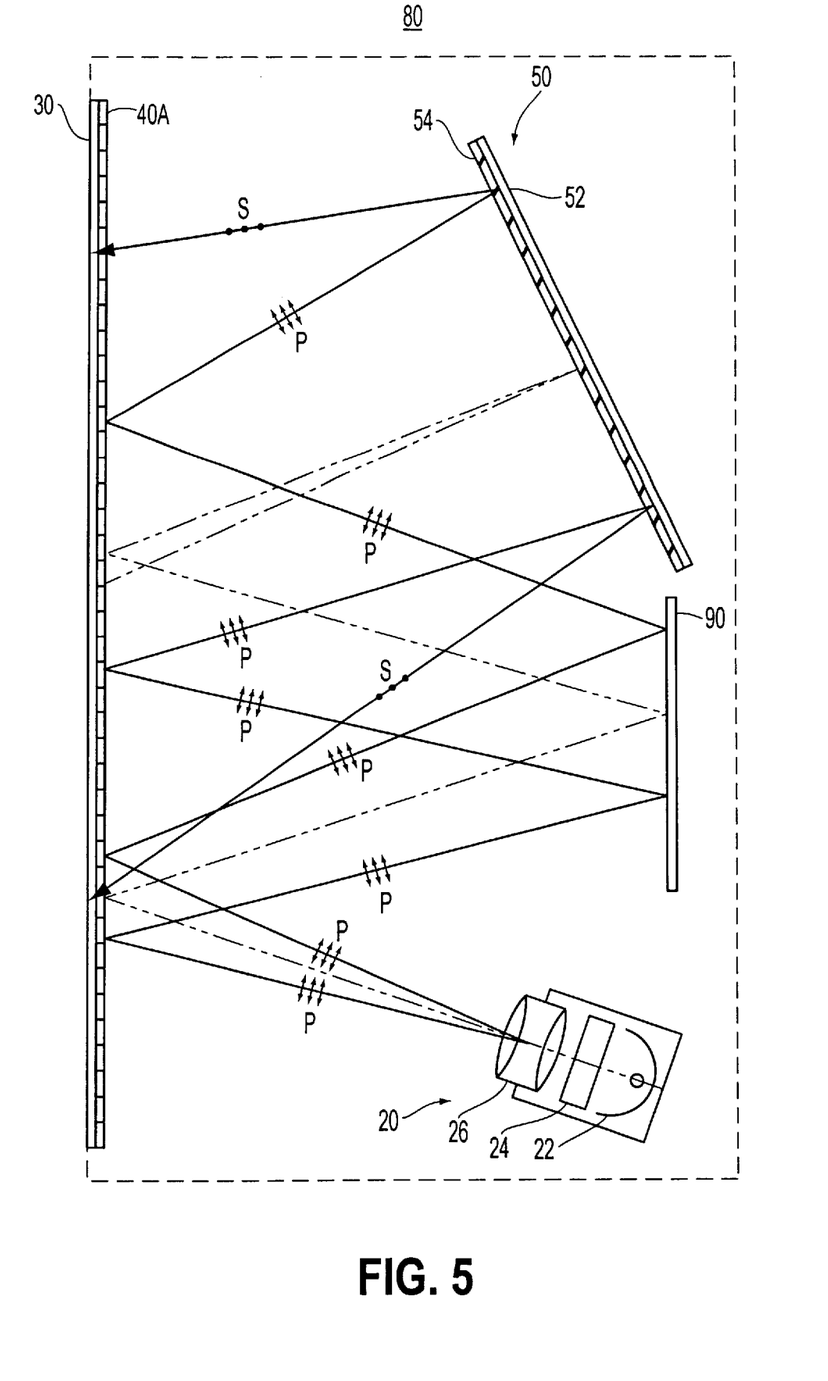
FIG. 5 is a schematic view of the structure of a rear projection display of a fourth embodiment of the present invention, as seen from a side thereof.

FIG. 5 is a schematic view of the structure of a rear projection display of a fourth embodiment of the present invention, as seen from a side thereof. The rear projection display 80 differs from the rear projection display 70 of the third embodiment in that it is provided with a reflecting mirror 90. The rear projection display 80 is constructed such that light from the image projector 20, reflected by the polarizing selection element 40A, is reflected by the reflecting mirror 90 and then reflected once again by the polarizing selection element 40A, after which the polarized light is converted by the polarizing conversion mirror 50, and the converted polarized light is projected onto the screen 30.

As with the rear projection display 70 of the third embodiment, the rear projection display 80 makes it possible to eliminate almost all of the dead space provided for positioning an image projector and a reflecting mirror in conventional rear projection displays. Accordingly, it allows almost all of the front side area of the rear projection display 80 to be used as screen positioning area. Although the rear projection display 80 of the fourth embodiment is provided with one reflecting mirror, it may be provided with a plurality of reflecting mirrors so as to allow light to be reflected a plurality of times at the polarizing selection element 40A. This allows the optical path from the image projector 20 to the screen 30, serving as a projection surface, to become longer, so that the projection lens can be reduced in size.

The present invention is not limited to the above-described embodiments, so that various modifications can be made without departing from the gist and scope thereof, as follows.

Although in the above-described embodiments the polarizing conversion reflection element (polarizing conversion mirror) was described as consisting of a $\lambda/4$ phase element and a reflecting mirror, it may consist of a $\lambda/2$ phase element ($\lambda/2$ film) and a reflecting mirror. When a $\lambda/2$ phase element is used, it is necessary to adjust the relative positions of the $\lambda/2$ phase element and the reflecting mirror so that light, which passes through the $\lambda/2$ phase element and which is reflected by the reflecting mirror, does not pass again through the $\lambda/2$ phase element.

In the above-described embodiments the image projector was described as consisting of an illuminating optical system, a light valve (a liquid crystal panel), and a projection lens. Instead of the liquid crystal panel, a modulator, such as a micromirror, may be used. A CRT and an image projector of the type that causes light from the CRT to emit therefrom as one type of linearly polarized light beams may be used. Instead of a CRT, a plasma display may be used. In other words, any type of image projector may be used as long as it projects modulated linearly polarized light beams having a predetermined polarization direction, in accordance with the image information.

What is claimed is:

1. A rear projector that projects and displays an image, the rear projection display comprising:
   a screen having a front side and a back side, the screen displaying the image on the front side by light projected onto the back side;
   an image projector comprising a light source, a projection lens and a modulating device that modulates light emitted from the light source in accordance with image information, in which first linearly polarized light beams of the light modulated by the modulating device are directed towards a predetermined location on the screen through the projection lens;

a polarizing selection element positioned at least on an optical path extending from the projection lens to a back surface on the back side of the screen, the polarizing selection element reflecting the first linearly polarized light beams emitted from the image projector through the projection lens, and letting pass therethrough linearly polarized light beams with a polarization direction perpendicular to that of the first linearly polarized light beams; and a polarizing conversion reflection element positioned on an optical path of light reflected by the polarizing selection element, the polarizing conversion reflection element converting the first linearly polarized light beams, reflected by the polarizing selection element, into second linearly polarized light beams with a polarization direction substantially perpendicular to that of the linearly polarized light beams reflected by the polarizing selection element for reflection towards the screen, at least some of the second linearly polarized light beams emitted from the polarizing conversion reflection element passing through the polarizing selection element and striking the back side of the screen.

2. The rear projector according to claim 1, the polarizing selection element being positioned on the back surface of the screen.

3. The rear projector according to claim 1, the polarizing conversion reflection element comprising a reflecting mirror and a $\lambda/4$ phase element positioned on an optical path of light incident upon and reflected by the reflecting mirror.

4. The rear projector according to claim 1, the polarizing selection element being divided into a plurality of sections, polarization separating characteristics of each section being adjusted in accordance with an angle of incidence of light with respect to each section.

5. The rear projector according to claim 1, the polarizing selection element being formed along an entire back surface of the screen.

6. The rear projector according to claim 5, further comprising a reflecting mirror positioned on an optical path of light reflected by the polarizing selection element.

7. The rear projector according to claim 1, the polarizing conversion reflection element comprising a reflecting mirror and a $\lambda/2$ phase element positioned on an optical path of light incident upon the reflecting mirror.

8. The rear projector according to claim 1, the polarizing selection element being formed such that polarization separating characteristics of the polarizing selection element vary continuously in accordance with an angle of incidence of light with respect to the polarizing selection element.

* * * * *